United States Patent [19]

Tinnes et al.

[11] 4,092,771

[45] June 6, 1978

[54] PROCESS AND APPARATUS FOR RENEWING SLIDING GATE VALVE UNITS FOR CASTING LADLES

[75] Inventors: Bernhard Tinnes, Zollikerberg; Franz Ruckstuhl, Schwerzenbach, both of Switzerland

[73] Assignee: Metacon AG, Zurich, Switzerland

[21] Appl. No.: 771,692

[22] Filed: Feb. 24, 1977

Related U.S. Application Data

[63] Continuation-in-part of Ser. No. 580,516, May 23, 1975, abandoned.

[30] Foreign Application Priority Data

Mar. 27, 1974  Switzerland .................. 7215/74

[51] Int. Cl.² .................. B23P 7/00; B23P 19/04; B23P 25/00
[52] U.S. Cl. .................. 29/401 F; 29/426; 29/722; 29/792; 29/793; 29/800
[58] Field of Search ............ 29/401 R, 401 F, 426, 29/430, 469, 722, 783, 785, 786, 791–793, 800

[56] References Cited

U.S. PATENT DOCUMENTS

| | | | |
|---|---|---|---|
| 2,405,544 | 8/1946 | Anjeskey | 29/430 |
| 2,850,775 | 9/1958 | Northington, Jr., et al. | 29/791 |

OTHER PUBLICATIONS

Leach, Thomas J., "Automated Assembly of Alloy Junction Transistors" From *Electronics*, Mar. 25, 1960, pp.57–61.

*Primary Examiner*—C.W. Lanham
*Assistant Examiner*—Daniel C. Crane
*Attorney, Agent, or Firm*—Cushman, Darby & Cushman

[57] ABSTRACT

Casting ladle gate valves of the type which are designed to be installed and removed from the ladle as a unit, are rebuilt in a work area which includes a disassembly station, a first assembly line including a revolving table for renewing the movable slide parts and a second assembly line including a revolving table for renewing the slide housings, and reassembling the slide parts, slide housings and clamping lids into renewed gate valve units. By preference, the disassembly station, both revolving tables and a conveyor for carrying the units to the work area from the foundry or steel work, and back are served by a slewing crane.

8 Claims, 5 Drawing Figures

PROCESS AND APPARATUS FOR RENEWING SLIDING GATE VALVE UNITS FOR CASTING LADLES

REFERENCE TO RELATED APPLICATION

This is a continuation-in-part of our copending application Ser. No. 580,516, filed May 23, 1975 and now abandoned in favor hereof.

FIELD OF THE INVENTION

The invention relates to an installation for renewing the refractory parts of sliding gate valve units for the casting ladles of foundries and steel works.

BACKGROUND OF THE INVENTION

In the case of a traditional sliding gate valve as described in Swiss Pat. No. 455,169, the slide housing which accommodates the stationary bedstone and has gliding guide elements for the movable slide part is firmly screwed to the bottom of the ladle. This means that disassembly of that gate valve, that is to say the removal of the movable slide part as well as removal of the stationary bedstone can be accomplished only while the gate valve remains secured on the ladle. Likewise the insertion of a new bedstone, the assembly of the slide and the tightening of the clamping screws can also be accomplished only on the ladle. For such operations, it is necessary that the ladle be disposed horizontally. For the insertion of the bedstone, a mounting device is often available, the handling of which however requires a high degree of care in order to assure that the bore of the bedstone and the bore of the slide stone in the assembled state of the gate valve and in its opened position are exactly in alignment. The assembly itself requires a neat method of operation. Also the proper tightening of the clamping screws is essential for the operational safety of the gate valve and requires sensitivity and reliability.

All these requirements are hardly compatible with the rough operation in the steel mill or in the foundry and with the capabilities of the majority of the personnel employed there. Again and again breakdowns with serious consequences occur in the operation of the gate valves because work which is of importance for its safety of operation has to be carried out at different work stations.

Recently, gate valves have become known, which form a self-contained unit and which contain all the refractory and mechanical parts including the slide housing, the movable slide part, hold down plate or lid and clamping screws as well as the coupling elements needed for a connection of the slide part with the drive. Such a unit is releasably connected with the casting ladle by means of bolts and wedges. The advantages of these unit type gate valves lies in the fact, that the overhauling, that is to say the clearing of the worn-out refractory material, the insertion of the new refractory parts and the reassembly need no longer take place in the rough conditions of the plant foundry room but in a central preparing room, reserved for this purpose. Furthermore one must consider it to be of advantage that the idle time of the ladle becomes essentially shorter as a result of the quick replacement of the unit. As compared to that, nothing has changed in the work expenditure for the renewal of the refractory parts.

SUMMARY OF THE INVENTION

The invention is based on the task of creating an installation which offers the optimum conditions for the renewal of the refractory parts of sliding gate valve units.

The invention provides a disassembly station. Subsequent to this there are two tracks for the flow of material for disassembled parts, with work stations assigned to each of the tracks for the material flow, as well as a final assembly station at which the two tracks for the material flow meet, whereby always at least one work station of each track for material flow is an assembly station for parts.

The combination of the work stations necessary for the disassembly, the assembly of parts and the final assembly and arrangements within an area separated from the operation of the steel mill brings with it important organizational advantages.

In a preferred embodiment a revolving table constitutes a component of each of the two tracks for the flow of material. These space-saving revolving tables serve for example on the one hand as storage places for a number of slide housings or of movable slide parts and they will permit on the other hand an effective assignment of work stations or stations for the assembly of parts at their periphery. These work stations assigned to the revolving tables are equipped advantageously with arrangements for the clearing or insertion of refractory parts, for the assembly of parts and/or for final assembly.

One of the revolving tables is equipped advantageously with a multiplicity of heating devices which serve for the preheating of the slide housings and correspondingly are assigned to the circulating places of attachment supporting the former. As a result of this preheating, a quick setting of the mortar needed for the insertion of the bed plate into the slide housing will be achieved, so that the final assembly of the valve unit may take place without any delay in time.

A further embodiment has an overhead trolley conveyor along a part of the one track for aiding the flow of material.

The great advantages of the installation unmistakably lie in the fact that the renewal of the refractory parts and the assembly of the unit can be accomplished economically and that a uniform quality can be achieved. Thus operational breakdowns of the gate valves causing high expenditures will be largely eliminated.

In the case of this installation, if it is desired, individual, similar work stations may be provided in a plurality in the sense that refractory parts of units of different sizes can be renewed next to one another.

An additional method of operation of the heating devices mentioned in one of the preceding embodiments given by way of example consists in the fact of maintaining the heating of the slide housing up to and during the final assembly of the unit.

The principles of the invention will be further discussed with reference to the drawing wherein a preferred embodiment is shown. The specifics illustrated in the drawings is intended to exemplify, rather than limit, aspects of the invention as defined in the claims.

DETAILED DESCRIPTION

Figure 1:
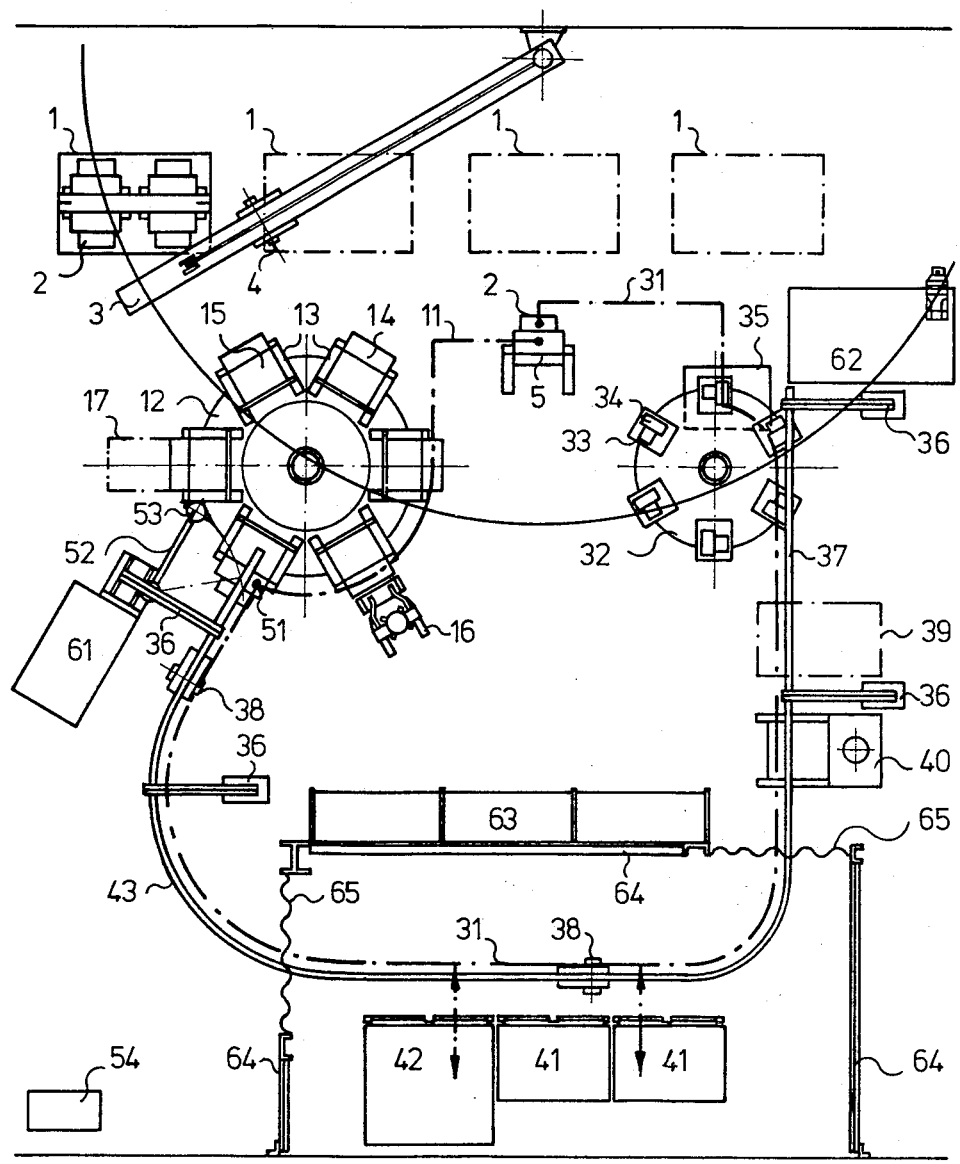
FIG. 1 is a schematic plan view of a preferred embodiment of the system for renewing sliding gate valve units for casting ladles in accordance with the present invention.

The figure depicts in schematic plan view, a work area, preferably in a room convenient to the steel work or foundry, but physically separate therefrom, in which sliding gate valve units for casting ladles are renewed.

In the renewing process, the units are disassembled, the worn-out fire resistant parts are replaced and the units are reassembled, preferably at an elevated temperature, are tightened and test-operated, and are sent back to the foundry or steel work.

The sliding gate valve units 2 are brought from the steel work or foundry to the work area on transporting frames 1. At the work area there is provided a loading and unloading means such as a wall-mounted slewing crane 3 having an electrically operated pulley block 4. The means 3, 4 is first used for serially unloading the units 2 to a disassembly station 5. There, each unit is taken apart into its main components, namely the slide housing 14, movable slide part 34 and clamping lid.

At the disassembly station two work flow circuits 31, 11 diverge, then rejoin later at a final assembly station 51.

The means 3, 4 is used to transfer the slide part 34 from the disassembly station 5, along the work flow circuit 31 to a receiving arrangement 33, one of several provided on the periphery of a revolving table 32. A container 35 is disposed under the table 32 at the site where the means 3, 4 deposits the slide part 34 in a receiving arrangement. The worn-out refractory elements of the sldie part are cleared out of the slide part and into the container 35. The table 32 is revolved to bring the next receiving arrangement over the container 35, thus bringing the cleared out slide part to the beginning of an overhead conveyor comprising a running track 37 mounted on brackets 36. Trolleys 38 are used for transporting the slide parts along the track 37.

The trolley 38 first transports a cleared out slide part from the revolving table 32 to an assembly arrangement 39 or 40. (These and others of the work stations may be duplicated to permit simultaneous or interpersed work on gate valve units of two or more different sizes.) At the station 39 or 40, the slide part is provided with new refractory elements set in a bed of mortar. Exemplary details of the assembly arrangement 39 or 40 are shown and described in the United States patent of present co-inventor Tinnes, U.S. Pat. No. 3,564,698, issued Feb. 23, 1971 on an application filed July 1, 1968, claiming priority from Swiss application 9,657/67 filed July 6, 1967. In the same manner, the slide part 34 is subsequently transported to beside one of the baking ovens 41 or 42. A transfer device, not shown in detail, is used for transferring the slide parts from the trolley 38 into the oven 41 or 42. There, the mortar joints are dried over a period lasting several hours. After the drying has been completed, the slide parts 34 are removed from the baking oven and are transported by a trolley 38 along the track 37 to a final assembly station 51.

The baking ovens 41, 42 are segregated into a separate area by walls 64 provided with curtain-type closures 65 to permit passage of the trolleys 38. Shelves 63 are shown provided on the outside of the walls 64 for storing a supply of refractory elements.

Meanwhile, the refractory bed plate is cleared out of the slide housing 14 at the disassembly station 5, and the slide housing together with the corresponding clamping lid is moved along the work flow circuit 11 by the means 3, 4 and secured at one of several attaching stations 13 disposed about the periphery of the revolving table 12. Each attaching station includes a heating device 15 and each slide housing 14 is mounted to the respective attaching station with the side of the slide housing which will face the ladle during use, facing the respective heating device 15.

The table 12 is then shifted to bring the slide housing having a freshly inserted bed plate to the final assembly station 51. At this station, a renewed slide part 34 is installed on the renewed slide housing 14, the clamping lid is put in place and the clamping bolts are tightened. All this is accomplished while the respective heating device continues to operate to raise the temperature to a predetermined degree. The slide part is attached to a hydraulic mounting cylinder 53 mounted on a swiveling arm 52 and powered from a hydraulic pump means 54. The cylinder 53 may be operated to reciprocate the slide part as the bolts are tightened to clamp the slide part to the slide housing with the clamping lid. (The bolts must be sufficiently tight that molten metal will not leak from between the slide part and the slide housing when the unit 2 is in use, but must be free to be slid between an open condition and a closed condition for controlling the flow of molten metal from the ladle.)

The mounting device 17 replicates the mounting device 16, for example for use with units 2 of a different size.

Exemplary details of the attaching station 13, heating device 15 and mounting cylinder 53 are shown and described in detail in the contemporaneously filed U.S. patent application of Tinnes, Ser. No. 578,315, filed May 16, 1975 (Corresponding to Swiss 7,108/74), now U.S. Pat. No. 4,051,589.

The hydraulic pump means 54 may also serve the mounting devices 16, 17, 39 and 40, and other work stations where power tools are used.

The tables 61, 62 are provided to permit minor repairs of mechanical parts of the units to be conducted adjacent the respective revolving tables. Further work stations may be provided if needed, since the revolving tables provide for a heavy workload to be processed.

Once the reassembly of the unit 2 has been completed at the point 51, further revolving of the table 12 brings that unit 2 within reach of the transfer means 3, 4 whereupon the unit is attached to the pulley block 4, released from the attaching station 13, and transferred to a transporting frame 1 for movement back to the steel work or foundry and installation upon a ladle.

Figure 2:
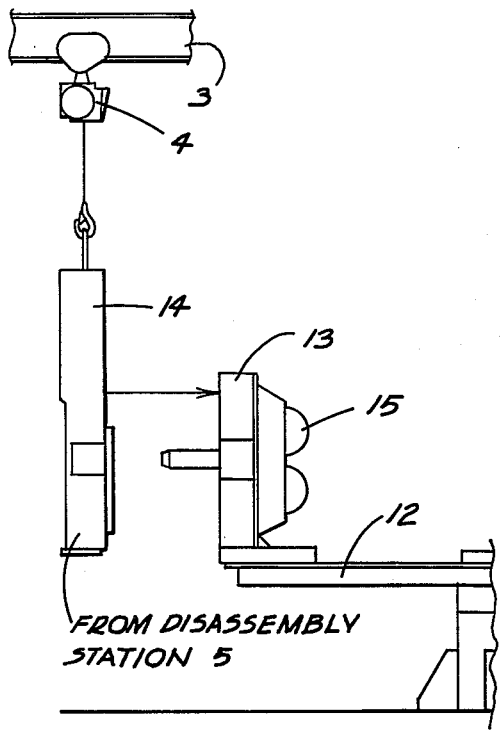
FIGS. 2, 3, 4 and 5 are fragmentary elevation views respectively depicting successive steps in final assembly of the sliding gate valve.
Figure 3:
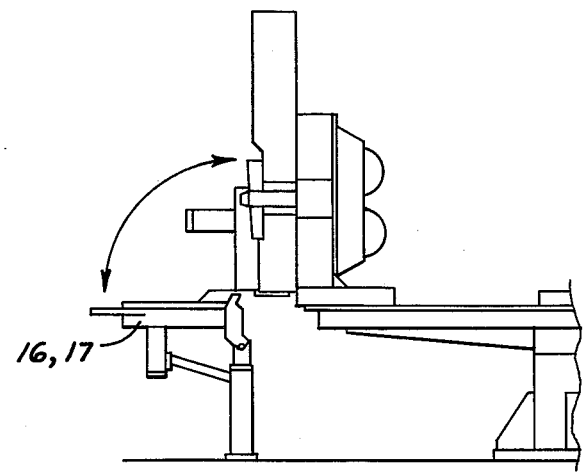
Figure 4:
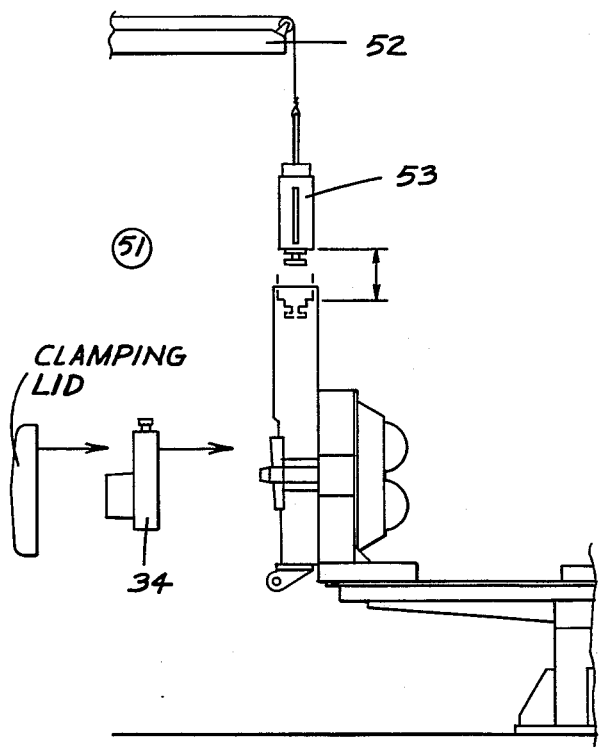
Figure 5:
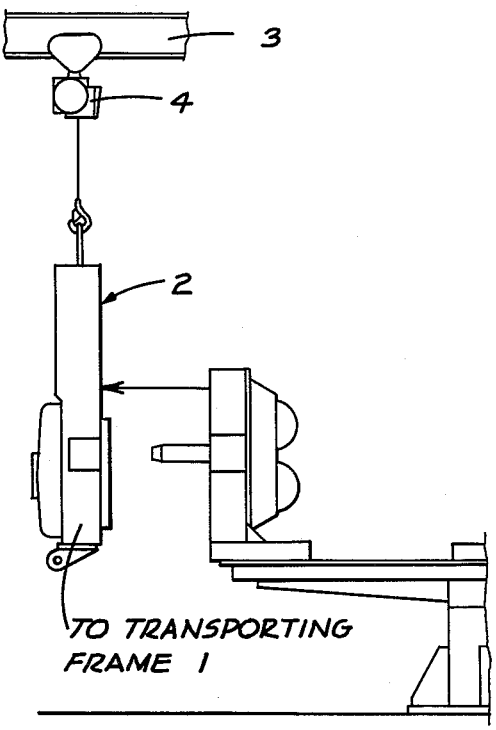

FIGS. 2-5 show the revolving table 12 in cooperation with the mounting device 16 and 17, heating device 15, mounting cylinder 53, 52, final assembly station 51 and attaching station 13, 14, illustrate how these items of apparatus cooperate with one another to complete the final sliding gate valve assembly operation.

The conveying means 31, 32, 38 and 12 are operated manually in the described embodiment. In other words, the crane 3, 4 is manually swiveled whereas the pulley block 4 is electrically operated. The movement of the tables 32 and 12 is effected by hand and the trolleys are pushed by the operators along the track 37 from one work station to the other.

The worn parts removed from the slide part are dropped into the container 35 by hand.

The disassembly is effected by means of wrenches where the metallic parts are connected with each other by screws, etc. On the other hand, the refractory elements of the slide parts are broken out by tools, such as a hammer and chisel.

The table 32 with its plurality of work pieces receiving arrangements 33 serves to temporarily store a plurality of work pieces 34 to thereby permit the carrying out of a certain operation at a group of slides or slide parts. Thus it may be preferable to remove the units 2 from the transporting frames, which may arrive individually or in groups serially and to return to the steel works the renewed units 2 equally in a serail manner. Thus, the two tables store series of parts in a like condition to subsequently be serially worked upon.

An assembly device of the type indicated at 39 or 40 is disclosed in U.S. Pat. No. 3,564,698. With respect to the cooperation of the heating devices 15 with the table 12 it should be noted that the heating devices are associated with the attaching station 13 which latter are supported on the table. Details of an attaching station including the heating device are described in a co-pending U.S. Patent application of Tinnes, Ser. No. 578,315.

The swiveling arm 52 is a horizontally extending arm carrying at its free end the cylinder 53 and permits to move the latter over station 51. The cylinder 53 includes a piston which may be connected to the movable slide part so as to move the latter up and down, the slide housing being attached to the attaching station 13 in vertical position. There is no cooperation with the mounting device 17 or the mounting device 16 which represent different stations along the table 12. Mounting devices 16 and 17 are similar to the mounting station 39 and 40 insofar as they permit to locate and orient a new refractory bed plate relative to the slide housing, i.e. the corresponding seat for the bed plate and press such bed plate into the seat to a predetermined depth. Such devices are known in the art and no details of their construction are therefore required.

We claim:

1. A system for renewing sliding gate valve units for casting ladles, comprising:
    a disassembly station for disassembly of the units into the slide housing, slide part and clamping lid of each;
    a final assembly station for reassembly of the units, following renewal of the slide housing and slide part of each;
    two separate loops of work stations originating at the disassembly station and rejoining at the final assembly station, these being a first loop for renewal of the slide parts and a second loop for renewal of the slide housings,
    the slide part renewal loop including a work station for clearing out worn-out refractory elements thereof, a work station for setting new refractory elements of the slide part in mortar and a baking oven for setting the mortar;
    the slide housing renewal loop including a work station for clearing out worn-out refractory elements thereof, a work station for setting new refractory elements in mortar, and a heating device for setting the mortar.

2. The system of claim 1 for renewing sliding gate valve units for casting ladles, further including:
    two revolving tables, one being included in each loop of work stations;
    the first of the revolving tables being provided with a plurality of receiving arrangements about the periphery thereof each for supporting a slide part, the work station for clearing out worn-out refractory elements of the slide part being located at this revolving table;
    the second of the revolving tables being provided with a plurality of attaching stations about the periphery thereof, each for securement of a respective slide housing thereto, the work station for setting new refractory elements of the slide housing in mortar being located at this revolving table.

3. The system of claim 2 for renewing sliding gate valve units for casting ladles, wherein:
    the final assembly station is located at the second revolving table.

4. The system of claim 3 for renewing sliding gate valve units for casting ladles, further comprising:
    an overhead trolley conveyor extending along the slide part renewal loop from adjacent the first revolving table to the final assembly station and including trolley means for transferring the slide parts successively from the first revolving table to the work station for clearing out worn-out refractory slide elements, the work station for setting new fire resistant slide elements, the baking oven and the final assembly station.

5. The system of claim 2 for renewing sliding gate valve units for casting ladles, wherein:
    the heating device of the slide housing renewal loop is constituted by an oven juxtaposed with each of the attaching stations on the second revolving table.

6. The system of claim 4, for renewing sliding gate valve units for casting ladles further comprising:
    hoist means having access to both revolving tables and to the disassembly station, for transferring slide parts from the disassembly station to the first revolving table, for transferring slide housings from the disassembly station to the second revolving table and for collecting reassembled, renewed sliding gate valve units from the second revolving table, following their reassembly at the final assembly station.

7. A method for renewing sliding gate valve units for casting ladles, comprising:
    disassembling each unit into its slide housing, slide part and clamping lid;
    shunting the slide housings and slide parts into two separate loops of work stations which rejoin at a final assembly station;
    in the first of loops, clearing out worn-out refractory elements from the slide parts, setting new refractory elements in mortar in the slide parts, baking the slide parts to set the mortar and transferring the renewed slide parts to the final assembly station;
    in the second of the loops, clearing out worn-out refractory bed stones from the slide housings, setting new refractory bed stones in mortar, heating the slide housings to set the mortar and transferring the renewed slide housings to the final assembly station; and
    reassembling the renewed slide parts and slide housings at the final assembly station, clamping these parts together with the clamping lids and tightening the lids to a predetermined degree.

8. The method of claim 7, further comprising:
    continuing to heat the slide housings during the final assembly, clamping and tightening, and dynamically testing for achievement of the predetermined degree of tightening by working the slide parts back and forth.

* * * * *